United States Patent
Munakata

(10) Patent No.: US 7,432,848 B2
(45) Date of Patent: Oct. 7, 2008

(54) INTER-VEHICLE DISTANCE DETECTING DEVICE AND INTER-VEHICLE DISTANCE DETECTING METHOD

(75) Inventor: Kohsuke Munakata, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 65 days.

(21) Appl. No.: 11/562,873

(22) Filed: Nov. 22, 2006

(65) Prior Publication Data
US 2007/0171121 A1    Jul. 26, 2007

(30) Foreign Application Priority Data
Dec. 5, 2005   (JP)   ............... 2005-350276

(51) Int. Cl.
- G01S 13/86  (2006.01)
- G01S 13/91  (2006.01)
- G01S 13/93  (2006.01)
- G01S 13/08  (2006.01)

(52) U.S. Cl. ............... 342/52; 342/70; 342/118; 382/103; 382/106

(58) Field of Classification Search ............. 342/70–72; 382/103–106; 701/117–119, 300–302
See application file for complete search history.

(56) References Cited

U.S. PATENT DOCUMENTS

| | | |
|---|---|---|
| 5,633,705 A | 5/1997 | Asayama |
| 6,900,754 B2 * | 5/2005 | Ono et al. ............... 342/158 |
| 7,042,389 B2 * | 5/2006 | Shirai ............... 342/70 |

FOREIGN PATENT DOCUMENTS

| | | |
|---|---|---|
| JP | H6-230115 | 8/1994 |
| JP | 2002327635 A * | 11/2002 |

* cited by examiner

Primary Examiner—Thomas H. Tarcza
Assistant Examiner—Cassi Galt
(74) Attorney, Agent, or Firm—Brinks Hofer Gilson & Lione

(57) ABSTRACT

There are provided an inter-vehicle distance detecting device and an inter-vehicle distance detecting method which can precisely measure an inter-vehicle distance from a user's own vehicle to a neighboring vehicle even if a radar becomes unable to detect the neighboring vehicle due to the influence of multipath or the like. If the radar does detect a neighboring vehicle, a width of the neighboring vehicle is calculated based on a precise inter-vehicle distance determined by the radar and a precise vehicle visual angle determined from an image taken by a camera, and is stored in a memory, and if the radar becomes unable to detect the neighboring vehicle, an inter-vehicle distance to the neighboring vehicle is calculated according to a trigonometric function based on the precise width of the neighboring vehicle previously stored in the memory and a precise vehicle visual angle determined from an image taken by the camera at this time.

22 Claims, 4 Drawing Sheets

INTER-VEHICLE DISTANCE DETECTING DEVICE ACCORDING TO PRESENT EMBODIMENT

INTER-VEHICLE DISTANCE DETECTING DEVICE
ACCORDING TO PRESENT EMBODIMENT

PRINCIPLE OF PROCESS TO CALCULATE VEHICLE WIDTH ACCORDING TO FIRST EMBODIMENT (a)  (b)

PRINCIPLE OF PROCESS TO CALCULATE INTER-VEHICLE DISTANCE ACCORDING TO FIRST EMBODIMENT (a)  (b)

INTER-VEHICLE DISTANCE DETECTING OPERATION
ACCORDING TO PRESENT EMBODIMENT

PRINCIPLE OF PROCESS TO CALCULATE VEHICLE WIDTH ACCORDING TO SECOND EMBODIMENT (a)

(b)

INTER-VEHICLE DISTANCE DETECTING DEVICE AND INTER-VEHICLE DISTANCE DETECTING METHOD

RELATED APPLICATIONS

The present application claims priority to Japanese Patent Application Number 2005-350276, filed Dec. 5, 2005, the entirety of which is hereby incorporated by reference.

BACKGROUND OF THE INVENTION

1. Field of the Invention

The present invention relates to an inter-vehicle distance detecting device and an inter-vehicle distance detecting method, and more particularly relates to a device which is preferably used to detect an inter-vehicle distance from a user's own vehicle to a neighboring vehicle by means of an onboard camera and an onboard radar.

2. Description of the Related Art

There recently have been provided systems which detect neighboring vehicles by means of onboard cameras and radars, show positional information on the detected neighboring vehicles to a user, and/or control steering according to the status of such information. There have also been provided systems which detect neighboring vehicles by means of cameras and radars, and conduct vehicle following by controlling a brake and an accelerator according to a result thereof to keep a constant inter-vehicle distance to a preceding vehicle. Any of these systems necessarily detect the distance from the user's own vehicle to a neighboring vehicle.

According to the method using a radar, the distance from the user's own vehicle to the neighboring vehicle is measured based on a time of travel of a radio wave such as a millimeter radio wave from emission to reception after reflection by the neighboring vehicle. According to the method using cameras, stereo cameras including a pair of cameras spaced apart are used, for example. According to this method, a pair of images of a neighboring vehicle acquired by the pair of cameras are compared to detect a difference between the images, thereby measuring the distance to the neighboring vehicle according to the principle of triangulation.

According to the method which uses radar, it is possible to accurately measure the distance to a neighboring vehicle. However, a neighboring vehicle might not be detected due to the influence of multipath where a direct wave, which is reflected by the neighboring vehicle and directly returns to the radar, and an indirect wave, which is further reflected by a road surface or the like and indirectly returns to the radar, cancel out each other, resulting in the reduction of a received signal strength. On the other hand, according to the method which uses cameras, though the precision of the measured distance is inferior to that measured by the radar, the above-described multipath phenomenon where a neighboring vehicle cannot be detected will not occur.

As a possible method to avoid the state where the distance to a neighboring vehicle cannot be measured, if a neighboring vehicle can be detected by the radar, the distance to the neighboring vehicle is measured based on the information from the radar, and if the radar becomes unable to detect the neighboring vehicle, the distance is measured by images acquired by the cameras. However, there arises a problem that the precision of the measured distance decreases if the radar cannot detect the neighboring vehicle and the radar is simply switched over to the cameras.

There is proposed a technology which calculates respective reliabilities for an inter-vehicle distance measured based on data acquired by a radar, and an inter-vehicle distance measured based on data acquired by cameras, and employs a detected inter-vehicle distance with a higher reliability (Japanese Unexamined Patent Publication No. H6-230115, for example). However, the technology disclosed by Japanese Unexamined Patent Publication No. H6-230115 only calculates the reliability of the distance measured by the cameras, and cannot increase the precision of the measured distance.

SUMMARY OF THE INVENTION

The present invention is devised in view of the foregoing problems, and has an object to precisely measure an inter-vehicle distance from a user's own vehicle to a neighboring vehicle even if the neighboring vehicle cannot be detected by a radar due to the influence of multipath and the like.

To attain the above object, the present invention, upon using a radar to detect a neighboring vehicle, calculates a width of the neighboring vehicle based on the distance acquired by the radar and a visual angle of the neighboring vehicle acquired by an image taken by a camera, and stores the width in a recording medium. If the radar becomes unable to detect the neighboring vehicle, the distance to the neighboring vehicle is calculated based on the width information for the neighboring vehicle stored in the recording medium, and the visual angle of the neighboring vehicle acquired by the image taken by the camera at this time.

According to the present invention configured as described above, since both the distance acquired by the radar and the visual angle of the neighboring vehicle acquired by the image taken by the camera are highly precise, it is possible to precisely calculate the width of the neighboring vehicle based on these pieces of information if the radar is detecting the neighboring vehicle. If the radar becomes unable to detect the neighboring vehicle, since the distance to the neighboring vehicle is calculated based on the precise width information for the neighboring vehicle stored in the recording medium and the precise visual angle of the neighboring vehicle acquired by the image taken by the camera at this time, the measured distance is precise.

In this way, according to the present invention, the inter-vehicle distance from the user's own vehicle to the neighboring vehicle is precisely measured by the radar if the radar is detecting the neighboring vehicle, and the inter-vehicle distance can be precisely measured based on the precise vehicle width already stored and the precise vehicle visual angle acquired by the image recognition process even if the radar becomes unable to detect the neighboring vehicle.

DESCRIPTION OF THE PREFERRED EMBODIMENTS

First Embodiment

A description will now be given of a first embodiment of the present invention with reference to drawings.

Figure 1:
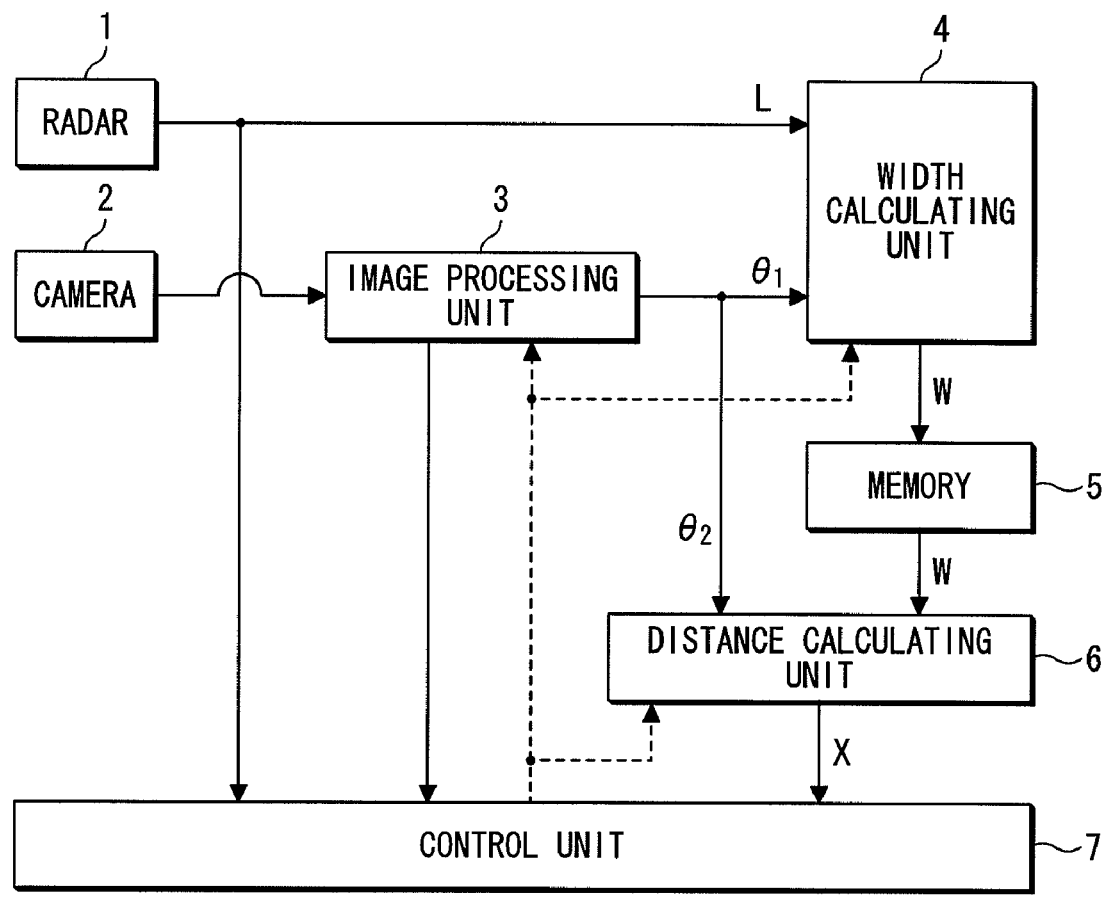
FIG. 1 is a block diagram showing an example of the configuration of an inter-vehicle distance detecting device according to first and second embodiments.

In FIG. 1, reference numeral 1 denotes a radar, and is installed at the rear of a vehicle. This radar 1 emits a radio wave such as a millimeter wave to the rear of the vehicle and receives the millimeter wave reflected from behind, thereby measuring the position (distance from and direction with respect to the user's own vehicle) and a relative velocity of a neighboring vehicle present behind the user's own vehicle. The distance from the user's own vehicle to the neighboring vehicle (inter-vehicle distance) is measured based on the time of travel of the millimeter wave from emission to reception after the reflection by the neighboring vehicle, and the velocity of the millimeter wave. It should be noted that in addition to a millimeter wave radar, an infrared radar and other radars may be used as the radar 1.

Reference numeral 2 denotes a camera which is also installed at the rear of the vehicle, and takes images to the rear of the vehicle. If a neighboring vehicle is present behind the user's own vehicle, the neighboring vehicle is imaged by the camera 2. The camera 2 according to the present embodiment is not necessarily a stereo camera, and one camera disposed at the center at the rear of the vehicle, for example, is sufficient. Though the camera 2 is not necessarily disposed at the center of the rear, the camera 2 is preferably disposed at the center.

Figure 2:
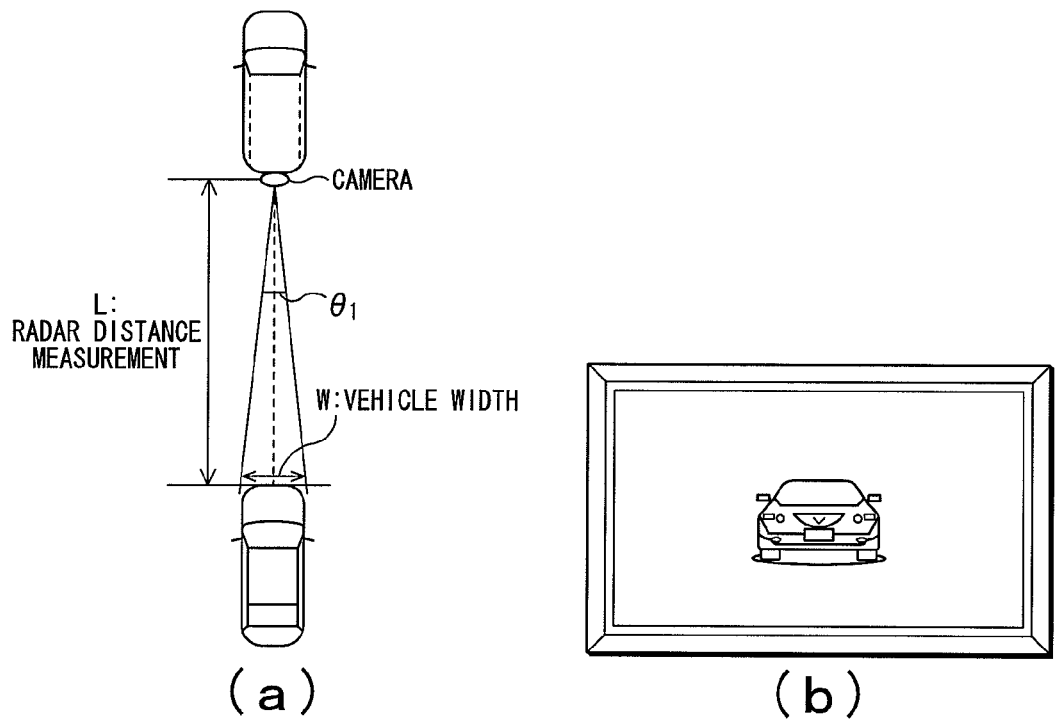
FIGS. 2(a) and 2(b) show a principle of an inter-vehicle distance detecting process according to the first embodiment, and a principle of a process to calculate a vehicle width.
Figure 3:
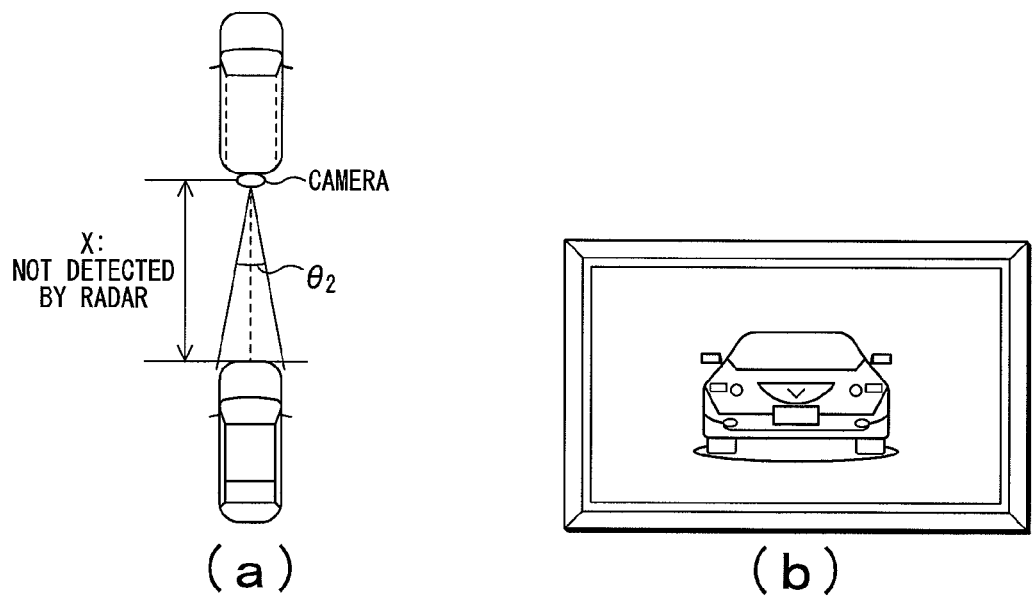
FIGS. 3(a) and 3(b) show the principle of the inter-vehicle distance detecting process according to the first embodiment, and a principle of a process to calculate an inter-vehicle distance.

Reference numeral 3 denotes an image processing unit which acquires a visual angle of a neighboring vehicle as viewed from the camera 2 by applying an image recognition process to an image taken by the camera 2. The visual angle in this case is the extent of an angle of view in the width direction of the neighboring vehicle (the visual extent from one side to the other side in the direction of the vehicle width) as viewed from the camera 2. In the examples shown in FIGS. 2 and 3, $\theta_1$ and $\theta_2$ correspond to the vehicle visual angles. It should be noted that $\theta_1$ is a vehicle visual angle acquired by the image processing unit 3 if the neighboring vehicle is being detected by the radar 1, and $\theta_2$ is a vehicle visual angle acquired by the image processing unit 3 if the neighboring vehicle is not being detected by the radar 1 due to multipath influence or the like.

Reference numeral 4 denotes a width calculating unit which calculates the vehicle width of the neighboring vehicle based on the distance to the neighboring vehicle acquired by the radar 1, and the vehicle visual angle acquired by the image processing unit 3. Namely, as FIG. 2(a) shows, the width calculating unit 4 calculates the vehicle width W of the neighboring vehicle according to:

$$W = 2L \times \tan(\theta_1/2) \quad (1)$$

where L denotes the distance to the neighboring vehicle determined by the radar 1, and $\theta_1$ denotes the visual angle of the vehicle determined by the image processing unit 3.

Reference numeral 5 denotes a memory (corresponding to a recording medium according to the present invention) which stores the width information W for the neighboring vehicle as calculated by the width calculating unit 4. The width calculating unit 4 periodically (at a predetermined time interval, for example) receives the distance L to the neighboring vehicle from the radar 1 if the radar 1 is detecting the neighboring vehicle, and the vehicle visual angle $\theta_1$ from the image processing unit 3, thereby periodically calculating the vehicle width W of the neighboring vehicle. The width calculating unit 4 then stores the vehicle width information W in the memory 5 each time. It is only necessary that the memory 5 stores the latest vehicle width information W, and the latest information may overwrite older information. The memory 5 may be volatile or non-volatile.

Reference numeral 6 denotes a distance calculating unit which calculates the distance X to the neighboring vehicle based on the vehicle width information W on the neighboring vehicle stored in the memory 5 and the vehicle visual angle $\theta_2$ acquired by the image processing unit 3. Namely, as FIG. 3(a) shows, the distance calculating unit 6 calculates the distance X to the neighboring vehicle if the radar 1 is not detecting the neighboring vehicle according to:

$$X = W/2 \tan(\theta_2/2) \quad (2)$$

Reference numeral 7 denotes a control unit which controls the operations of the image processing unit 3, the width calculating unit 4, and the distance calculating unit 6. Specifically, the control unit 7 determines whether a neighboring vehicle is being detected or not based on a received signal strength of the radio wave received by the radar 1. For example, the control unit 7 determines that a neighboring vehicle is not being detected if the received signal strength of the radio wave is equal to or less than a threshold, and determines that a neighboring vehicle is being detected if the received signal strength is more than the threshold.

If the control unit 7 determines that a neighboring vehicle is being detected by the radar 1, the control unit 7 activates the width calculating unit 4, and deactivates the distance calculating unit 6. On this occasion, the control unit 7 employs the distance L determined by the radar 1 as inter-vehicle distance information used for a vehicle follower function and a steering assistance function. On the other hand, if the control unit 7 determines that a neighboring vehicle is not being detected by the radar 1, the control unit 7 activates the distance calculating unit 6, and deactivates the width calculating unit 4. On this occasion, the control unit 7 employs the distance X determined by the distance calculating unit 6 as the inter-vehicle distance information used for the vehicle follower function and the steering assistance function.

The above-described functions of the width calculating unit 4, the distance calculating unit 6, and the control unit 7 may be realized by any of a hardware configuration, a DSP (Digital Signal Processor), and software. If the functions are realized by software, for example, the width calculating unit 4, the distance calculating unit 6, and the control unit 7 are actually configured by a CPU or MPU, a RAM, a ROM and the like of a computer, and are realized by the operation of programs stored in the RAM and the ROM.

Though there is described the example where whether a neighboring vehicle is detected by the radar 1 or not is determined based on the received signal strength of the radio wave from the radar 1, the determination of the presence of a neighboring vehicle is not limited to this example. For example, the image processing unit 3 may determine whether a neighboring vehicle is detected or not also by means of the result of the image recognition process by the image processing unit 3. With the image recognition process, it is possible to easily determine whether the image taken by the camera 2 contains a neighboring vehicle.

The cases where the received signal strength at the radar 1 is equal to or less than the threshold includes a case where the received signal strength is decreased by the influence of multipath such as the reflection by a road surface even if a neighboring vehicle is actually present, and a case where a neighboring vehicle is not actually present. If a neighboring vehicle is not actually present, the image processing unit 3 cannot acquire the vehicle visual angle θ2, and the distance calculating unit 6 cannot acquire the inter-vehicle distance X. Since it is not necessary to acquire the inter-vehicle distance if a neighboring vehicle is not present, there arises no problem. However, it is possible to prevent a wasteful consumption of electric power by recognizing that a neighboring vehicle is not present, and then stopping the operation of the width calculating unit 4 and the distance calculating unit 6.

Figure 4:
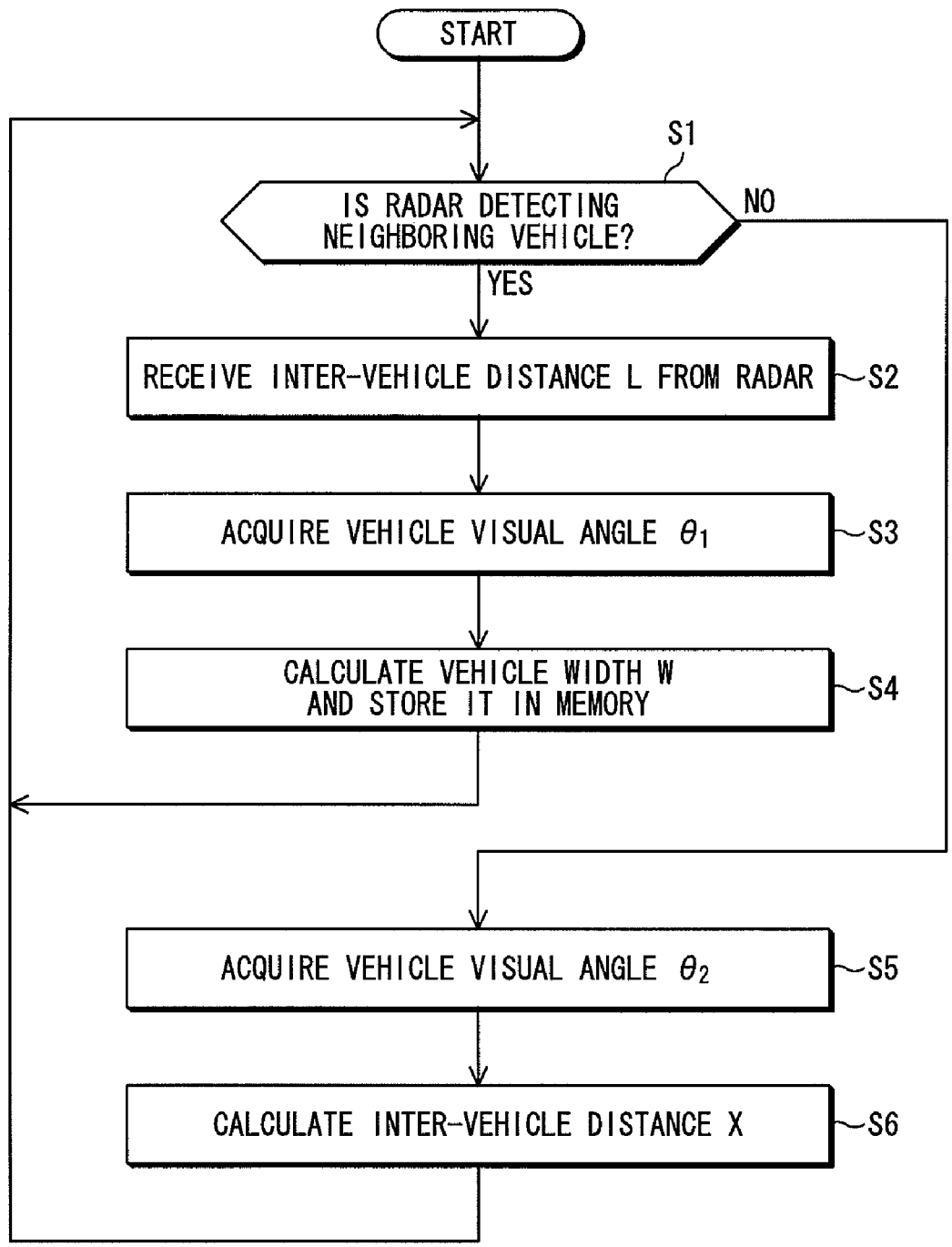
FIG. 4 is a flowchart showing an example of an operation to detect the inter-vehicle distance (inter-vehicle distance detecting method) according to the first embodiment.

A description will now be given of an operation of the inter-vehicle distance detecting device according to the first embodiment configured as described above. FIG. 4 is a flowchart showing an example of the operation to detect the inter-vehicle distance (inter-vehicle distance detecting method) according to the first embodiment.

In FIG. 4, the control unit 7 determines whether a neighboring vehicle is detected by the radar 1 based on the received signal strength of the radio wave of the radar 1 (step S1). If the control unit 7 determines that the radar 1 is detecting a neighboring vehicle, the control unit 7 receives the inter-vehicle distance L acquired by the radar 1, and employs the inter-vehicle distance L as the inter-vehicle distance information used for the vehicle follower function and the steering assistance function (step S2). On this occasion, the control unit 7 stops the operation of the distance calculating unit 6.

The image processing unit 3 then acquires the vehicle visual angle $\theta_1$, which is the extent of the angle of view of the vehicle width of the neighboring vehicle as viewed from the camera 2, by applying the image recognition process to an image taken by the camera 2 (step S3). The width calculating unit 4 then calculates the vehicle width W of the neighboring vehicle based on the distance L to the neighboring vehicle acquired by the radar 1 and the vehicle visual angle $\theta_1$ acquired by the image processing unit 3 according to the above equation (1), and stores the acquired vehicle width information W in the memory 5 (step S4).

If the control unit 7 determines that the radar 1 is not detecting a neighboring vehicle in step S1, the control unit 7 stops the operation of the width calculating unit 4, and activates the distance calculating unit 6. On this occasion, the image processing unit 3 is operating. The image processing unit 3 then acquires the vehicle visual angle $\theta_2$, which is the extent of the angle of view of the vehicle width of the neighboring vehicle as viewed from the camera 2, by applying the image recognition process to the image taken by the camera 2 (step S5).

The distance calculating unit 6 calculates the distance X to the neighboring vehicle based on the vehicle width W of the neighboring vehicle stored in the memory 5 and the vehicle visual angle $\theta_2$ acquired by the image processing unit 3 according to the above equation (2) (step S6). After the processing in step S4 or step S6, the control unit 7 returns to step S1, and continues the same process.

As detailed above, according to the present embodiment, if the radar 1 is detecting a neighboring vehicle, the vehicle width W of the neighboring vehicle is calculated according to the equation (1) based on the inter-vehicle distance L acquired by the radar 1 and the vehicle visual angle $\theta_1$ acquired from an image taken by the camera 2, and is stored in the memory 5. If the radar 1 becomes unable to detect the neighboring vehicle, the distance X to the neighboring vehicle is calculated according to the equation (2) based on the vehicle width W of the neighboring vehicle stored in the memory 5, and the vehicle visual angle $\theta_2$ acquired at this time from the image taken by the camera 2.

The radar 1 can precisely measure the distance L to the neighboring vehicle, and the precise vehicle visual angle $\theta_1$ can be acquired by means of image recognition from the image taken by the camera 2. As a result, if the radar 1 is detecting a neighboring vehicle, the precise vehicle width W of the neighboring vehicle can be acquired according to a trigonometric function such as the equation (1) using these precise measurements.

If the radar 1 becomes unable to detect the neighboring vehicle, the precise distance X to the neighboring vehicle can be acquired according to the equation (2), which employs a trigonometric function, based on the precise vehicle width W of the neighboring vehicle acquired in advance as described above, and the precise vehicle visual angle $\theta_2$ of the neighboring vehicle acquired by the image taken by the camera 2 at this time. As a result, even if the radar 1 becomes unable to detect a neighboring vehicle, the measurement precision of the inter-vehicle distance can be maintained properly.

Second Embodiment

A description will now be given of a second embodiment with reference to the drawings. According to the second embodiment, even if a neighboring vehicle is present obliquely behind the own vehicle, the inter-vehicle distance X can be calculated. The configuration of the inter-vehicle distance detecting device according to the second embodiment is similar to that in FIG. 1.

Figure 5:
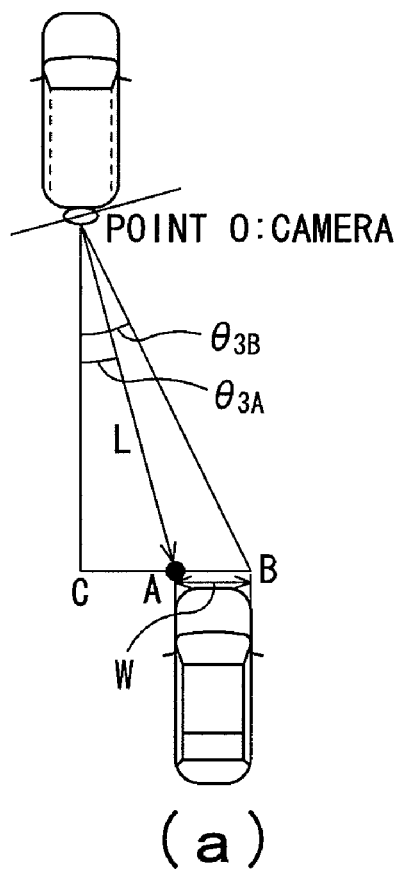
FIG. 5 shows a principle of an inter-vehicle distance detecting process according to the second embodiment, and a principle of a process to calculate a vehicle width.
Figure 5:
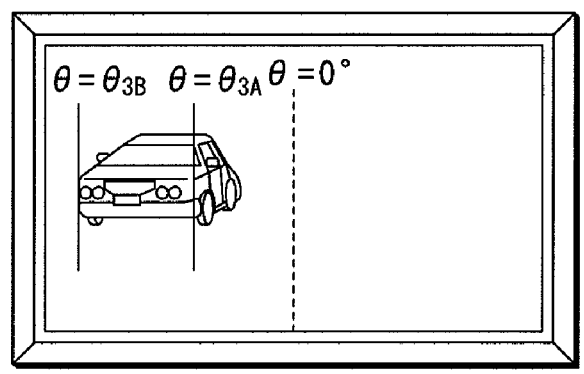

FIGS. 5(a) and 5(b) show a principle of an inter-vehicle distance detecting process according to the second embodiment, and a principle of a process to calculate a vehicle width of a neighboring vehicle. FIG. 5(a) shows a positional relationship between the user's own vehicle and a neighboring vehicle, and FIG. 5(b) shows an image taken by a camera 2.

According to the second embodiment, the image processing unit 3, upon the radar 1 detecting a neighboring vehicle, acquires a first visual angle $\theta_{3A}$ which ranges from a direction orthogonal to an image plane of the camera 2 (direction toward the immediate rear of the vehicle if the camera 2 is installed such that the image plane directly faces to the rear of the vehicle) to one side (point A in FIG. 5(a)) of the width of the neighboring vehicle, and a second visual angle $\theta_{3B}$ which ranges from the direction orthogonal to the image plane of the camera 2 to the other side (point B in FIG. 5(b)) of the width of the neighboring vehicle.

Moreover, the width calculating unit 4 calculates the vehicle width W of the neighboring vehicle according to:

$$W = L(\cos\theta_{3A} \times \tan\theta_{3B} - \sin\theta_{3A}) \qquad (3)$$

where L denotes the distance to the neighboring vehicle acquired by the radar 1, namely a distance from the camera 2 to a point A of the neighboring vehicle.

Namely, there are defined as:

$OC = L \times \cos\theta_{3A}$ $AC = L \times \sin\theta_{3A}$ $BC = OC \times \tan\theta_{3B} = L \times \cos\theta_{3A} \times \tan\theta_{3B}$ where a point O denotes the position of the camera 2, and a point C denotes an intersection between a line AB and a perpendicular line extending in a direction orthogonal to the image plane of the camera 2 from the point O.

Therefore:

$$W = AB = BC - AC = L \times \cos\theta_{3A} \times \tan\theta_{3b} - L \times \sin\theta_{3A}$$ (5)

If the radar 1 is not detecting the neighboring vehicle, the distance calculating unit 6 calculates the distance X to the neighboring vehicle according to:

$$X = W/(\cos\theta_{4A} \times \tan\theta_{4B} - \sin\theta_{4A})$$ (4)

where $\theta_{4A}$ and $\theta_{4B}$ respectively denote a first visual angle and a second visual angle acquired by the image processing unit 3.

As detailed above, according to the second embodiment, even when a neighboring vehicle is not directly behind the user's own vehicle, it is possible to precisely measure the inter-vehicle distance to the neighboring vehicle if the radar 1 is not detecting the neighboring vehicle.

Though the first and second embodiments describe methods to measure the inter-vehicle distance between the user's own vehicle and a neighboring vehicle to the rear, the present invention is not limited thereto. For example, the present invention can be applied to measurement of the distance to a neighboring vehicle ahead of or to the side of the user's own vehicle. In these cases, the radar 1 and the camera 2 may be installed in a desired direction to measure the inter-vehicle distance.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An inter-vehicle distance detecting device comprising:
   a radar that detects a distance to a neighboring vehicle by measuring a period from emission of an electromagnetic wave to reception of the wave reflected by the neighboring vehicle;
   a camera that images the neighboring vehicle;
   an image processing unit that determines a visual angle of the neighboring vehicle as viewed from said camera by applying an image recognition process to an image acquired by said camera;
   a width calculating unit that calculates the width of the neighboring vehicle based on the distance to the neighboring vehicle detected by said radar and the visual angle of the neighboring vehicle determined by said image processing unit;
   a recording medium that stores information on the width of the neighboring vehicle calculated by said width calculating unit; and
   a distance calculating unit that calculates the distance to the neighboring vehicle based on the information on the width of the neighboring vehicle stored in said recording medium and the visual angle of the neighboring vehicle determined by said image processing unit.

2. The inter-vehicle distance detecting device according to claim 1, comprising a control unit that causes said distance calculating unit to calculate the distance to the neighboring vehicle if said radar does not detect the neighboring vehicle.

3. The inter-vehicle distance detecting device according to claim 1, wherein said image processing unit determines a visual angle of an extent of the width of the neighboring vehicle.

4. The inter-vehicle distance detecting device according to claim 3, wherein said width calculating unit calculates the width W of the neighboring vehicle according to $W = 2L \times \tan(\theta_1/2)$ wherein L denotes the distance to the neighboring vehicle detected by said radar, and $\theta_1$ denotes the visual angle of the extent of the width of the neighboring vehicle determined by said image processing unit.

5. The inter-vehicle distance detecting device according to claim 4, wherein said distance calculating unit calculates the distance X to the neighboring vehicle according to $X = W/2\tan(\theta_2/2)$ wherein $\theta_2$ denotes the visual angle of the extent of the width of the neighboring vehicle determined by said image processing unit.

6. The inter-vehicle distance detecting device according to claim 1, wherein said image processing unit determines a first visual angle of a range from a direction orthogonal to an image plane of said camera to one side of the width of the neighboring vehicle, and a second visual angle of a range from the direction orthogonal to the image plane of said camera to the other side of the width of the neighboring vehicle.

7. The inter-vehicle distance detecting device according to claim 6, wherein said width calculating unit calculates the width W of the neighboring vehicle according to $W = L(\cos\theta_{3A} \times \tan\theta_{3B} - \sin\theta_{3A})$, wherein L denotes the distance to the neighboring vehicle detected by said radar, and $\theta_{3A}$ and $\theta_{3B}$ respectively denote the first and second visual angles determined by said image processing unit.

8. The inter-vehicle distance detecting device according to claim 7, wherein said distance calculating unit calculates the distance X to the neighboring vehicle according to $X = W/(\cos\theta_{4A} \times \tan\theta_{4B} - \sin\theta_{4A})$, wherein $\theta_{4A}$ and $\theta_{4B}$ respectively denote the first and second visual angles determined by said image processing unit.

9. An inter-vehicle distance detecting method comprising:
   a first act of determining whether a neighboring vehicle is detected by a radar based on a received signal strength of an electromagnetic wave received by the radar;
   a second act of determining, upon a neighboring vehicle being detected by said first act, a distance to the neighboring vehicle based on a period from emission of the wave by the radar to reception of the wave reflected by the neighboring vehicle;
   a third act of determining a visual angle of the neighboring vehicle as viewed from a camera by applying an image recognition process to an image acquired by the camera;
   a fourth act of calculating the width of the neighboring vehicle based on the distance to the neighboring vehicle determined by said second act and the visual angle of the neighboring vehicle determined by said third act, and storing information on the acquired width in a recording medium;
   a fifth act of, upon a neighboring vehicle not being detected by said first act, determining a visual angle of the neighboring vehicle as viewed from the camera by applying an image recognition process to the image acquired by the camera; and
   a sixth act of calculating the distance to the neighboring vehicle based on the information on the width of the neighboring vehicle stored in the recording medium and the visual angle of the neighboring vehicle determined by said fifth act.

10. The inter-vehicle distance detecting method of claim 9, wherein the acts of determining a visual angle of the neighboring vehicle determine a visual angle of an extent of the width of the neighboring vehicle.

11. The inter-vehicle distance detecting method of claim 10, wherein the act of calculating the width calculates the width W of the neighboring vehicle according to $W=2L \times \tan(\theta_1/2)$ wherein L denotes the distance to the neighboring vehicle detected by said radar, and $\theta_1$ denotes the visual angle of the extent of the width of the neighboring vehicle.

12. The inter-vehicle distance detecting method of claim 11, wherein the act of calculating the distance calculates the distance X to the neighboring vehicle according to $X=W/2\tan(\theta_2/2)$ wherein $\theta_2$ denotes the visual angle of the extent of the width W of the neighboring vehicle.

13. The inter-vehicle distance detecting method of claim 9, wherein the acts of determining a visual angle of the neighboring vehicle determine a first visual angle of a range from a direction orthogonal to an image plane of said camera to one side of the width of the neighboring vehicle, and a second visual angle of a range from the direction orthogonal to the image plane of said camera to the other side of the width of the neighboring vehicle.

14. The inter-vehicle distance detecting method of claim 13, wherein the act of calculating the width calculates the width W of the neighboring vehicle according to $W=L(\cos\theta_{3A} \times \tan\theta_{3B} - \sin\theta_{3A})$, wherein L denotes the distance to the neighboring vehicle detected by said radar, and $\theta_{3A}$ and $\theta_{3B}$ respectively denote the first and second visual angles.

15. The inter-vehicle distance detecting method of claim 14, wherein the act of calculating the distance calculates the distance X to the neighboring vehicle according to $X=W/(\cos\theta_{4A} \times \tan\theta_{4B} - \sin\theta_{4A})$, wherein $\theta_{4A}$ and $\theta_{4B}$ respectively denote the first and second visual angles.

16. An inter-vehicle distance detecting method comprising:

storing a width of a neighboring vehicle;

determining a visual angle of the neighboring vehicle as viewed from a camera associated with the user's own vehicle by applying an image recognition process to an image of the neighboring vehicle acquired by the camera; and calculating the distance from the user's own vehicle to the neighboring vehicle using the stored width and the visual angle of the neighboring vehicle.

17. The inter-vehicle distance detecting method of claim 16, wherein the width of the neighboring vehicle is calculated using a distance from the user's own vehicle to the neighboring vehicle as determined by a radar associated with the user's own vehicle, and a visual angle of the neighboring vehicle as viewed from the camera.

18. The inter-vehicle distance detecting method of claim 17, wherein the act of calculating the width calculates the width W of the neighboring vehicle according to $W=2L \times \tan(\theta_1/2)$ wherein L denotes the distance to the neighboring vehicle detected by said radar, and $\theta_1$ denotes the visual angle of the extent of the width of the neighboring vehicle.

19. The inter-vehicle distance detecting method of claim 16, wherein the act of calculating the distance calculates the distance X to the neighboring vehicle according to $X=W/2\tan(\theta_2/2)$ wherein $\theta_2$ denotes the visual angle of the extent of the width W of the neighboring vehicle.

20. The inter-vehicle distance detecting method of claim 16, wherein the act of determining a visual angle of the neighboring vehicle determines a first visual angle of a range from a direction orthogonal to an image plane of said camera to one side of the width of the neighboring vehicle, and a second visual angle of a range from the direction orthogonal to the image plane of said camera to the other side of the width of the neighboring vehicle.

21. The inter-vehicle distance detecting method of claim 20, further comprising an act of calculating the width which calculates the width W of the neighboring vehicle according to $W=L(\cos\theta_{3A} \times \tan\theta_{3B} - \sin\theta_{3A})$, wherein L denotes the distance to the neighboring vehicle detected by a radar, and $\theta_{3A}$ and $\theta_{3B}$ respectively denote the first and second visual angles.

22. The inter-vehicle distance detecting method of claim 21, wherein the act of calculating the distance calculates the distance X to the neighboring vehicle according to $X=W/(\cos\theta_{4A} \times \tan\theta_{4B} - \sin\theta_{4A})$, wherein $\theta_{4A}$ and $\theta_{4B}$ respectively denote the first and second visual angles.

* * * * *